United States Patent [19]
Ito et al.

[11] Patent Number: 6,010,284
[45] Date of Patent: Jan. 4, 2000

[54] BORING MACHINE FOR MACHINING OR BORING A SEMI-CYLINDRICAL WORKPIECE

[75] Inventors: Yoshitaka Ito; Katsumi Asai; Takayoshi Sasaki, all of Nagoya, Japan

[73] Assignee: Daido Metal Company Ltd., Nagoya, Japan

[21] Appl. No.: 08/946,217

[22] Filed: Oct. 7, 1997

[30] Foreign Application Priority Data

Dec. 20, 1996 [JP] Japan ................................. 8-355097

[51] Int. Cl.[7] .................................................. B23B 39/00
[52] U.S. Cl. .............................. 408/54; 408/70; 408/108
[58] Field of Search ................................ 408/54, 69, 70, 408/103, 108

[56] References Cited

U.S. PATENT DOCUMENTS

| | | | |
|---|---|---|---|
| 3,296,934 | 1/1967 | Kelly | 408/54 |
| 5,379,510 | 1/1995 | Berge | 408/70 |
| 5,429,461 | 7/1995 | Mukherjee et al. | 408/70 |

FOREIGN PATENT DOCUMENTS 4017690  8/1940  Japan .

*Primary Examiner*—Andrea Pitts
*Assistant Examiner*—Monica Smith
*Attorney, Agent, or Firm*—Browdy and Neimark

[57] ABSTRACT

There is disclosed a boring machine capable of achieving high processing precision and high processing efficiency. A table is mounted on a bed for reciprocal movement in right and left directions. A workpiece fixing device for fixing workpieces W of a semi-cylindrical shape is mounted on the bed. Cutting tools P and Q for cutting the workpieces W, a workpiece carry-in device and a workpiece carry-out device are provided on the table. The table is moved to a left side, and the workpieces W are placed on the workpiece carry-in means. Then, the table is moved to a right side to transfer the workpieces W to the workpiece fixing device. The table is again moved to the left side, so that each workpiece W is subjected to a boring processing by the cutting tools P and Q. The workpiece carry-out device receives the processed workpieces W, and then the workpieces W are unloaded from the boring machine by a workpiece unloading device, and are fed to a subsequent step.

14 Claims, 11 Drawing Sheets

BORING MACHINE FOR MACHINING OR BORING A SEMI-CYLINDRICAL WORKPIECE

BACKGROUND OF THE INVENTION

1. Field of the Invention

This invention relates to a boring machine for machining or boring a semi-cylindrical workpiece, such for example as a semi-cylindrical intermediate product obtained during a process of producing a half bearing.

2. Description of the Related Technology

For example, in a process of producing a half bearing, a sheet piece of a rectangular shape is bent into a semi-cylindrical shape, and then an inner surface of this sheet piece is subjected to boring, thereby obtaining the precision of a bearing surface. There is known a boring machine which is provided with workpiece carry-in and carry-out means in order to efficiently bore a large amount of workpieces. In the conventional boring machine, as schematically shown in FIG. 14(A), a workpiece $W_1$ is fixed to a workpiece fixing portion S mounted on a bed, and a spindle T, having cutting tools P and Q attached thereto, is movable in an axial direction. The workpiece fixing portion S is mounted on a moving mechanism (not shown), and when the boring processing for the workpiece $W_1$, fixed to the workpiece fixing portion S, is finished, the workpiece fixing portion S is retracted or moved radially outwardly of the spindle T (FIG. 14(B)), and in this retracted position, the removal of the workpiece $W_1$ from the workpiece fixing portion S and the attachment of a next workpiece $W_2$ to the workpiece fixing portion S are effected. After the workpiece $W_2$ is thus fixed to the workpiece fixing portion S, the workpiece fixing portion S is again moved or advanced into a processing (boring) position.

Recently, it has been required to process the inner surface of half bearings with a high degree of precision on the order of microns.

However, the workpiece fixing portion S is moved between the retracted position and the processing position each time the workpiece is subjected to the boring processing, and therefore it has been difficult to set the workpiece fixing portion S relative to the spindle T with the precision on the order of microns since this setting is influenced directly by a positioning error caused by the moving mechanism, and therefore the precision of processing of the workpiece has been limited.

After the boring processing is finished, the workpiece fixing portion S is retracted, and the processed workpiece W1 is removed from the workpiece fixing portion S, and after the next (unprocessed) workpiece $W_2$ is supplied, and is fixed to the workpiece fixing portion S, the step in which the workpiece fixing portion S is again advanced into the processing position is needed, and the reduction of the time required for this step has been limited.

SUMMARY OF THE INVENTION

It is therefore an object of this invention to provide a boring machine in which workpiece carry-in means and workpiece carry-out means are provided on a table, and a workpiece fixing portion is fixed in a processing position so that high processing precision and high processing efficiency can be obtained.

According to the feature of the present invention to achieve the objective, there is provided a boring machine comprising means for carrying in workpiece which is mounted on a table, and means for carrying out the workpiece, which is mounted on the table, wherein the workpiece carry-in means receives a workpiece when the table is moved to one side, and then is moved toward the other side to transfer the workpiece to means for fixing the workpieces; and wherein the workpiece carry-out means receives the workpiece, released from the workpiece fixing means, when the table is moved to the one side, and then is moved toward the other side to transfer the workpiece to a workpiece unloading position.

With this construction, a spindle, the workpiece carry-in means and the workpiece carry-out means, which are mounted on the table, are reciprocally moved right and left on the bed together with the table. An unprocessed workpiece is loaded from the exterior onto the boring machine by means for loading the workpiece, and is held in a predetermined stand-by position. Then, when the table is moved to one side, the workpiece carry-in means receives this workpiece. Then, the table is moved to the other side, so that the workpiece carry-in means transfers the workpiece to a position where the workpiece fixing means is provided. Then, the workpiece is fixed to the workpiece fixing means. Then, during the time when the table is moved from the other side to the one side, an inner surface of the workpiece is subjected to a boring processing by cutting tools mounted on the spindle. When the table is moved to the one side, a new, unprocessed workpiece is received by the workpiece carry-in means as described above. The processed workpiece, fixed to the workpiece fixing means, is released therefrom, and is received by the workpiece carry-out means. Further, when the table is moved to the other side, the workpiece, received by the workpiece carry-out means, is transferred, and is unloaded by means for unloading the workpiece, and is fed to a subsequent step.

Thus, the workpieces are carried in and out by the workpiece carry-in means and the workpiece carry-out means which are provided on the table, and therefore a processing error, produced as a result of moving the workpiece fixing means by a moving mechanism as in the conventional machine, will not be encountered.

When the table is moved from the other side to the one side, the workpiece is subjected to the boring processing, and when the table is moved to the other side, the carrying-out of the processed workpiece and the carrying-in of a new, unprocessed workpiece are effected at the same time.

According to another feature of the present invention, the workpiece carry-in means includes a support surface for placing the workpiece thereon, and the workpiece, placed on the support surface, is transferred to the workpiece fixing means while being held in a clamped condition. Therefore, the workpiece is positively transferred.

According to another feature of the present invention, the workpiece carry-in means includes a vertically-movable workpiece carry-in member having an upper surface serving as a support surface for placing the workpiece thereon.

With this construction, when the table is moved to the other side, so that the workpiece carry-in means transfers the workpiece to the position where the workpiece fixing means is provided, the workpiece carry-in member is moved upward to lift the workpiece to bring the same into the workpiece fixing means.

According to another feature of the present invention, a distal end portion of the spindle is rotatably supported by a distal end bearing mounted on the table, and the workpiece carry-in means is mounted on that side of the table disposed on that side of the distal end bearing directed to the one side.

Thus, the workpiece carry-in means is provided at that region where the spindle is not provided, and therefore the workpiece carry-in means can be simplified in construction.

According to another feature of the present invention, a distal end portion of the spindle is rotatably supported by a distal end bearing mounted on the table, and the workpiece carry-in means is mounted on that side of the table disposed between the distal end bearing and the cutting tool. Therefore, when the table is reciprocally moved, the distal end bearing will not pass through a narrow space beneath the workpiece fixing means. Therefore, the size of the workpieces to be processed is not limited by the shape and size of the distal end bearing.

According to another feature of the present invention, means for loading the workpiece for loading the unprocessed workpiece onto the boring machine is provided at one side of the bed, and means for unloading the workpiece for unloading the processed workpiece from the boring machine is provided at the other side of the bed. With this construction, there can be provided the boring machine having a higher operation efficiency.

According to another feature of the present invention, a plurality of workpieces are serially arranged, and are subjected to a boring processing. Therefore, the plurality of workpieces can be processed at the same time.

According to the present invention, the workpiece carry-in means and the workpiece carry-out means are mounted on the table, and the workpiece carry-in means receives a workpiece, loaded onto the boring machine by the workpiece loading means, when the table is moved to one side, and the workpiece carry-in means transfers the workpiece to the workpiece fixing means when the table is moved to the other side. The workpiece carry-out means receives the workpiece, released from the workpiece fixing means, when the table is moved to the one side, and when the table is moved to the other side, the workpiece carry-out means transfers the workpiece to the workpiece unloading position so that the workpiece unloading means can unload the workpiece from the boring machine. With this construction, there can be obtained the boring machine having an excellent processing efficiency.

According to the present invention, the workpiece carry-in means transfers the workpiece, placed on the support surface, in such a manner that the workpiece is held in a clamped condition, and therefore the workpiece is positively transferred.

According to the present invention, the workpiece carry-in member for placing the workpiece thereon is vertically movable, and therefore when the workpiece carry-in member is located at the workpiece fixing means, the workpiece carry-in member is moved upward to bring the workpiece into the workpiece fixing means.

According to the present invention, the workpiece carry-in means is mounted on that side of the table disposed on that side of the distal end bearing (which supports the distal end portion of the spindle) directed to the one side. Thus, the workpiece carry-in means is provided at that region where the spindle is not provided, and therefore the workpiece carry-in means can be simplified in construction since the interference with the spindle does not need to be taken into consideration.

According to the present invention, the workpiece carry-in means is mounted on that side of the table disposed between the distal end bearing (which supports the distal end portion of the spindle) and the cutting tool. Therefore, the distal end bearing, which is larger in shape and size than the spindle, will not pass through a narrow space beneath the workpiece fixing means, and with this construction smaller workpieces can be processed.

According to the present invention, a plurality of workpieces are serially arranged, and are subjected to a boring processing. Therefore, the plurality of workpieces can be processed at the same time, and there can be obtained the boring machine having a higher operation efficiency.

DESCRIPTION OF THE PREFERRED EMBODIMENTS

A preferred embodiment of a boring machine of the present invention used for a boring processing in the production of half bearings will now be described with reference to FIGS. 1 to 11.

Figure 1:
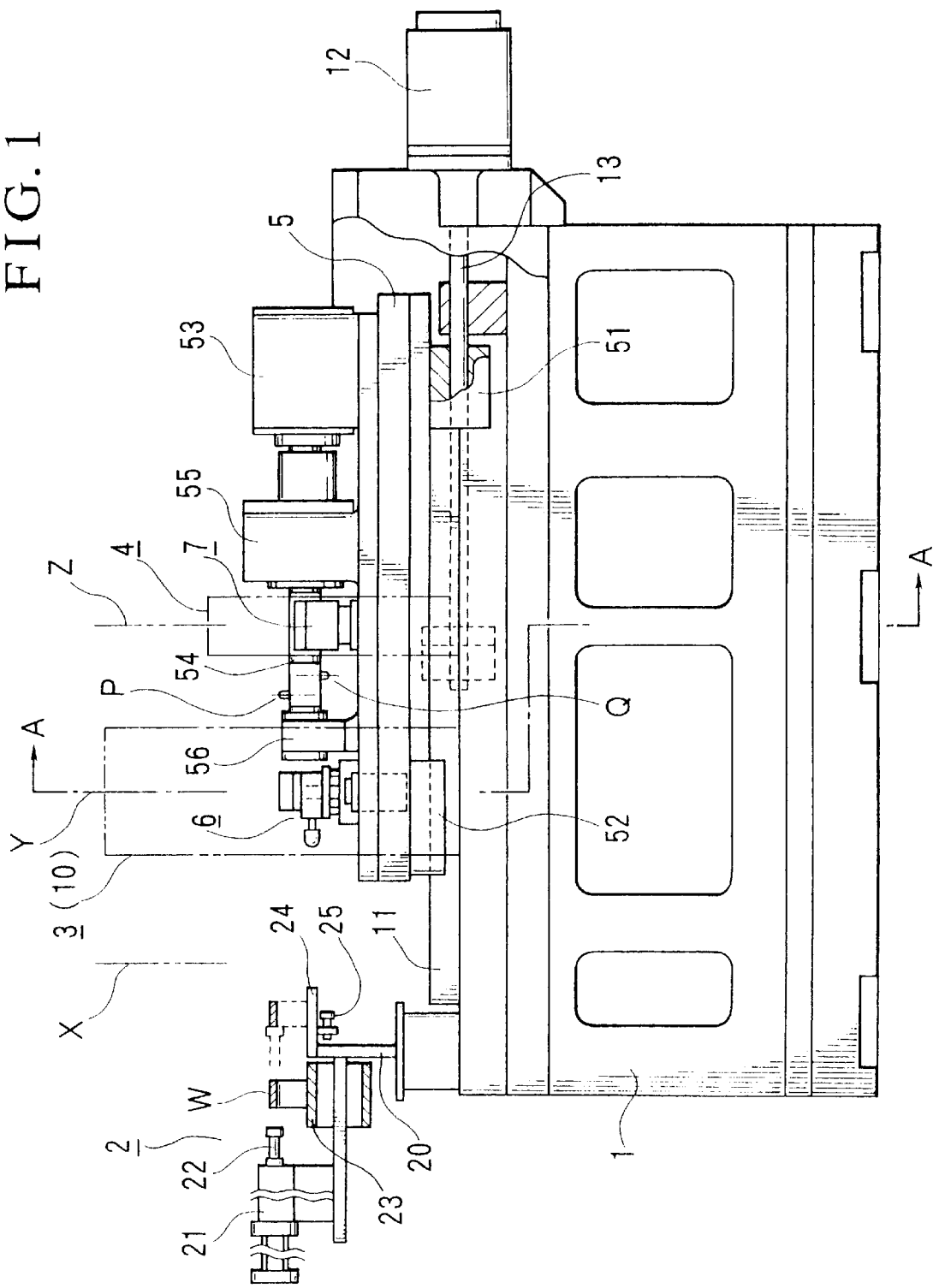
FIG. 1 is a partly-broken, front-elevational view of a boring machine of the present invention.

First, this embodiment will be briefly described with reference to FIGS. 1 and 2. In FIG. 1, workpiece loading means 2 for setting unprocessed workpieces W into a workpiece loading position X is provided on one side (left side in FIG. 1) of a bed 1. A housing 10 is mounted upright on a central portion of the bed 1, and workpiece fixing means 3 for fixing the workpieces W is provided in this housing 10 (This position is referred to as "workpiece fixing position Y"). Workpiece unloading means 4 for unloading the processed workpieces W from this boring machine, transferred from the workpiece fixing position Y to a workpiece unloading position Z, is provided on the other side (right side in FIG. 1) of the bed 1.

A pair of parallel guide rails 11 are mounted on an upper surface of the bed 1, and extend in the right-left direction, and a table 5 is mounted on the two guide rails 11 for sliding movement therealong. A mechanism for reciprocally moving this table 5 comprises a screw transmission mechanism, and a threaded shaft 13 is connected to a servo motor 12 mounted on a right end of the bed 1. A nut 51, fixedly secured to a lower side of the table 5, is threaded on this threaded shaft 13. Guide pieces 52 are fixedly secured to the lower surface of the table 5, and are mounted respectively on the two guide rails 11 for sliding movement therealong. With this construction, when the servo motor 12 is rotated in its normal and reverse directions, the table 5 is reciprocally moved left and right on the bed 1.

A drive motor 53 is mounted on a right end portion of the table 5, and a spindle 54, which is driven for rotation by this drive motor 53, is supported on the upper surface of the table 5 in generally parallel relation thereto by a proximal end bearing 55 and a distal end bearing 56 which bear the proximal and distal ends of the spindle 54, respectively. Two cutting tools P and Q for cutting the workpiece W are fixedly mounted on the outer peripheral surface of the spindle 54 intermediate the opposite ends thereof.

As in a conventional boring machine of the slide bearing type disclosed, for example, in Japanese Patent Examined Publication No. 40-17960, the spindle 54 is mounted on the table 5 in such a manner that the distal end portion of the spindle 54 is inclined at a small angle $\theta$ with respect to the table 5. The two cutting tools P and Q, mounted the spindle 54, are spaced a distance a from each other in a direction of the axis of the spindle 54 (see FIG. 3). A distal end (cutting edge) of the cutting tool P is projected farther from the spindle 54 so as to generate a circular locus larger than that generated by a distal end of the cutting tool Q.

Therefore, the boring processing is effected in such a manner that the two cutting tools P and Q generate the respective cutting loci, with their rotation axes being different by $a \cdot \tan\theta$. Namely, as shown in an exaggerated manner in FIG. 4, a central portion b of an inner surface of the workpiece W is cut by the cutting tool Q rotating about the rotation axis g while opposite end portions of the inner surface of the workpiece W are formed respectively into so-called crush relief surfaces c by the cutting tool P rotating about the rotation axis p.

Workpiece carry-in means 6 is mounted on that portion of the table 5 which is disposed on the left side of the distal end bearing 56, and is located in the workpiece loading position X when the table 5 is moved to the left-side position. Workpiece carry-out means 7 is mounted on that portion of the table 5 which is disposed between the proximal end bearing 55 and the cutting tools P and Q, and is located in the workpiece fixing position Y when the table 5 is moved to the left-side position, and is located in the workpiece unloading position Z when the table 5 is moved to the right-side position.

The above-mentioned constructions will be described in further detail.

(Workpiece Loading Means 2)

The workpiece loading means 2 is mounted on the left end portion (FIG. 1) of the bed 1. A loading cylinder 21 is mounted on a bracket 20 mounted upright on the bed 1. A belt conveyor 23 is provided forwardly of a loading pin 22 of the loading cylinder 21, and the unprocessed workpieces W are conveyed by the belt conveyor 23 through a stopper (not shown) into a position in front of the loading pin 22. A relay board 24 is provided on that side of the belt conveyor 23 facing away from the loading cylinder 21, and is disposed at the same level as that of the conveying surface of the belt conveyor 23, and this relay board 24 extends at its distal end to a position immediately before the workpiece loading position X (see FIG. 5).

Figure 5:
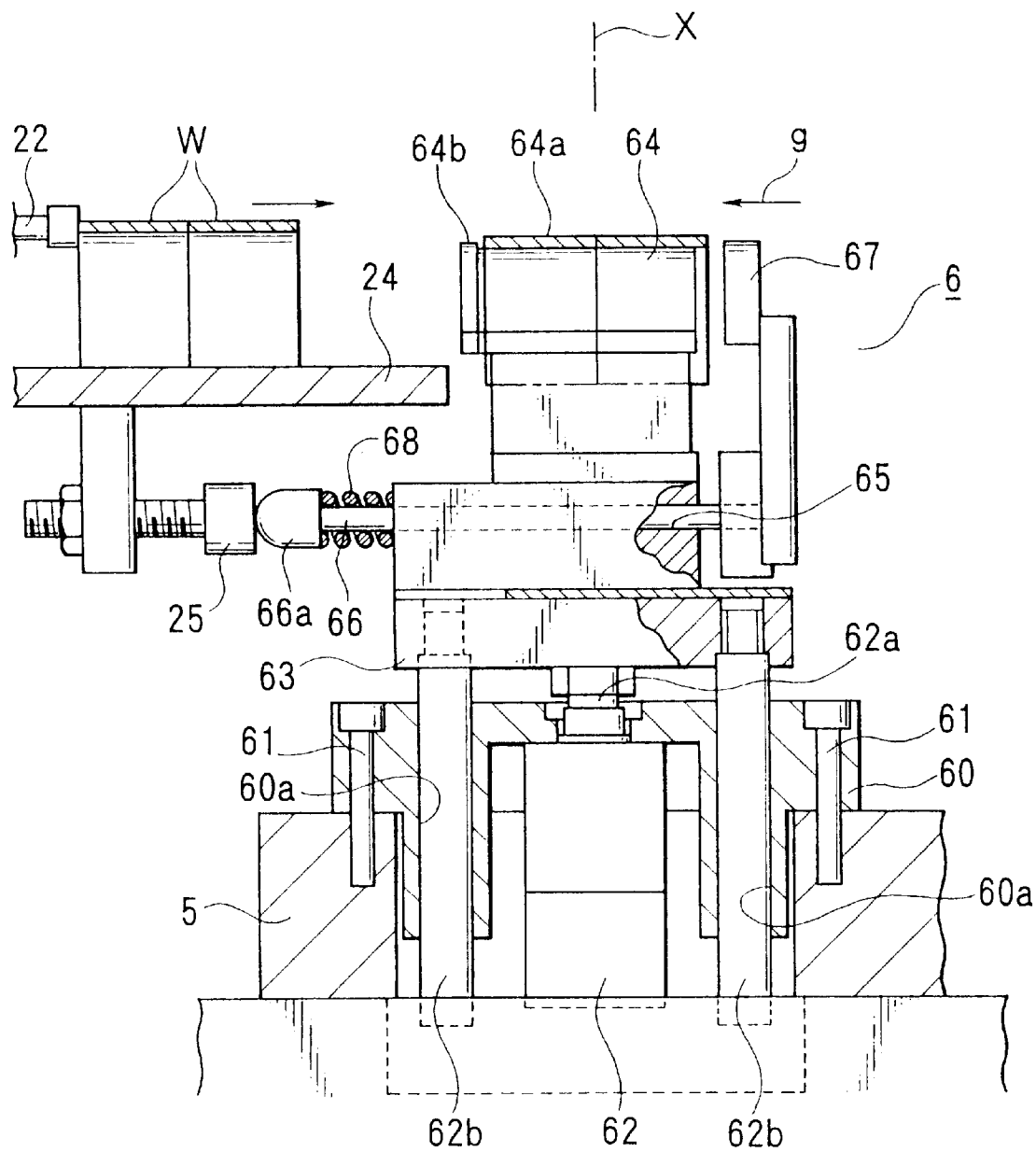
FIG. 5 is a partly-broken, front-elevational view showing workpiece carry-in means located at a workpiece loading position.

In this embodiment, there is shown an example in which two workpieces W are processed at a time. Therefore, the loading cylinder 21 is so adjusted that the loading pin 22 makes two extending motions, that is, a short-stroke motion and a long-stroke motion, during the time when the table 5 makes one reciprocal movement (that is, a forward movement and a backward movement). More specifically, the loading pin 22 is first extended a short stroke to push the first workpiece W, conveyed by the belt conveyer 23, onto the relay board 24, and then is retracted, and then is again extended a long stroke together with the subsequently-conveyed workpiece W, and pushes the two workpieces W beyond the relay board 24 in such a manner that the two workpieces W are arranged serially. With this construction, when the loading pin 22 of the loading cylinder 21 is extended a long stroke, the two workpieces W are slid over the relay board 24 to be transferred to a workpiece carry-in member 64 (described later) located in the workpiece loading position X. As shown in FIG. 5, an abutment piece 25 is mounted on the lower surface of the relay board 24.

(Workpiece Carrying-in Means 6)

As shown in FIG. 5, the workpiece carry-in means 6 for transferring the workpieces W from the workpiece loading position X to the workpiece fixing position Y is mounted on the left-side portion of the table 5 which is located at the workpiece loading position X when the table 5 is moved fully to the left-side position. In the workpiece carry-in means 6, a fixing block 60 is fixedly secured to the table 5 by fixing screws 61. A lift cylinder 62 is mounted on a lower surface of the fixing block 60. A lift block 63 is secured to a plunger 62a of the lift cylinder 62, and guide pins 62b and 62b, extending downwardly from a lower surface of the lift block 63, are fitted respectively in guide holes 60a and 60a, formed through the fixing block 60, for vertical movement therealong. With this construction, the lift block 63 can be moved upward and downward in accordance with the extension and retraction of the plunger 62a.

Figure 6:
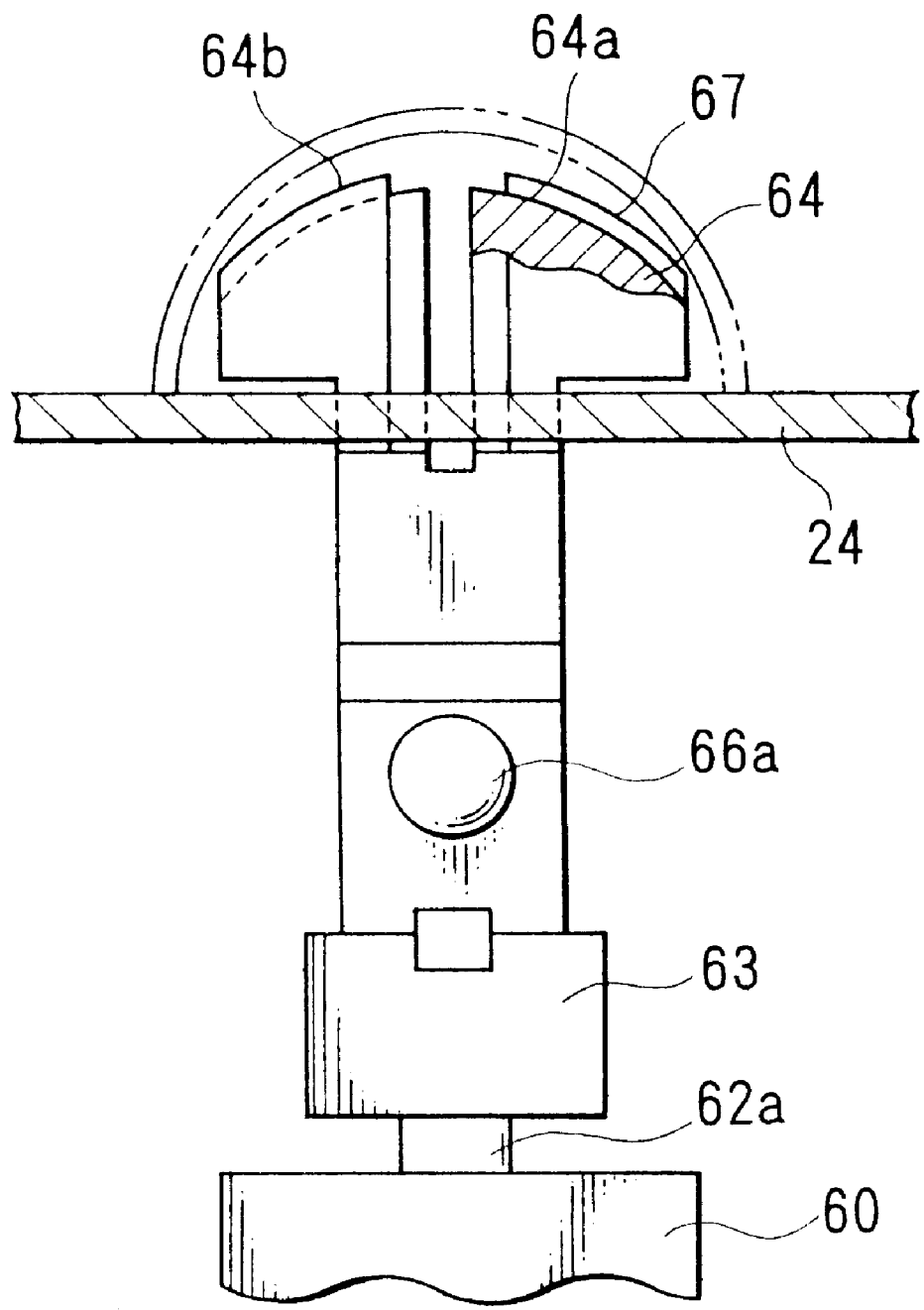
FIG. 6 is a side-elevational view of the workpiece carry-in means.

The workpiece carry-in member 64 is mounted on the lift block 63. As shown in FIG. 6, the workpiece carry-in member 64 has an upper surface defining a support surface 64a which has generally the same curvature as that of the inner peripheral surface of the workpiece W. The workpiece W can be placed on this support surface 64a in straddling relation thereto. An abutment projection 64b is provided at a left end (FIG. 5) of the support surface 64a, and when the workpieces W are pushed by the loading pin 22 to slide over the relay board 24, the workpieces W pass over the abutment projection 64b, and are transferred onto the support surface 64a.

A mounting hole 65 is formed in that side surface of the lift block 63 facing the abutment piece 25, and extends through the lift block 63. An impingement pin 66, having a pin head 66a, extends through the mounting hole 65, and a clamp plate 67 is connected to a proximal end of the impingement pin 66. A compression spring 68 is wound on that portion of the impingement pin 66, lying between the lift block 63 and the pin head 66a, to normally urge the impingement pin 66 into its extended condition. Namely, when the table 5 is moved to the left-side position, the pin head 66a impinges on the abutment piece 25 to be retracted, and therefore the clamp plate 67 is also retracted or moved back, so that the spacing between the abutment projection 64b and the clamp plate 67 becomes larger than the combined lengths of the two serially-arranged workpieces W.

Then, when the table 5 begins to move right, the clamp plate 67 moves forward under the influence of the coil spring 68, so that the workpieces W are clamped between the abutment projection 64b and the clamp plate 67. When the table 5 further moves right, the workpieces W are transferred to the workpiece fixing position Y while kept in the clamped condition.

(Workpiece Fixing Means 3)

Figure 2:
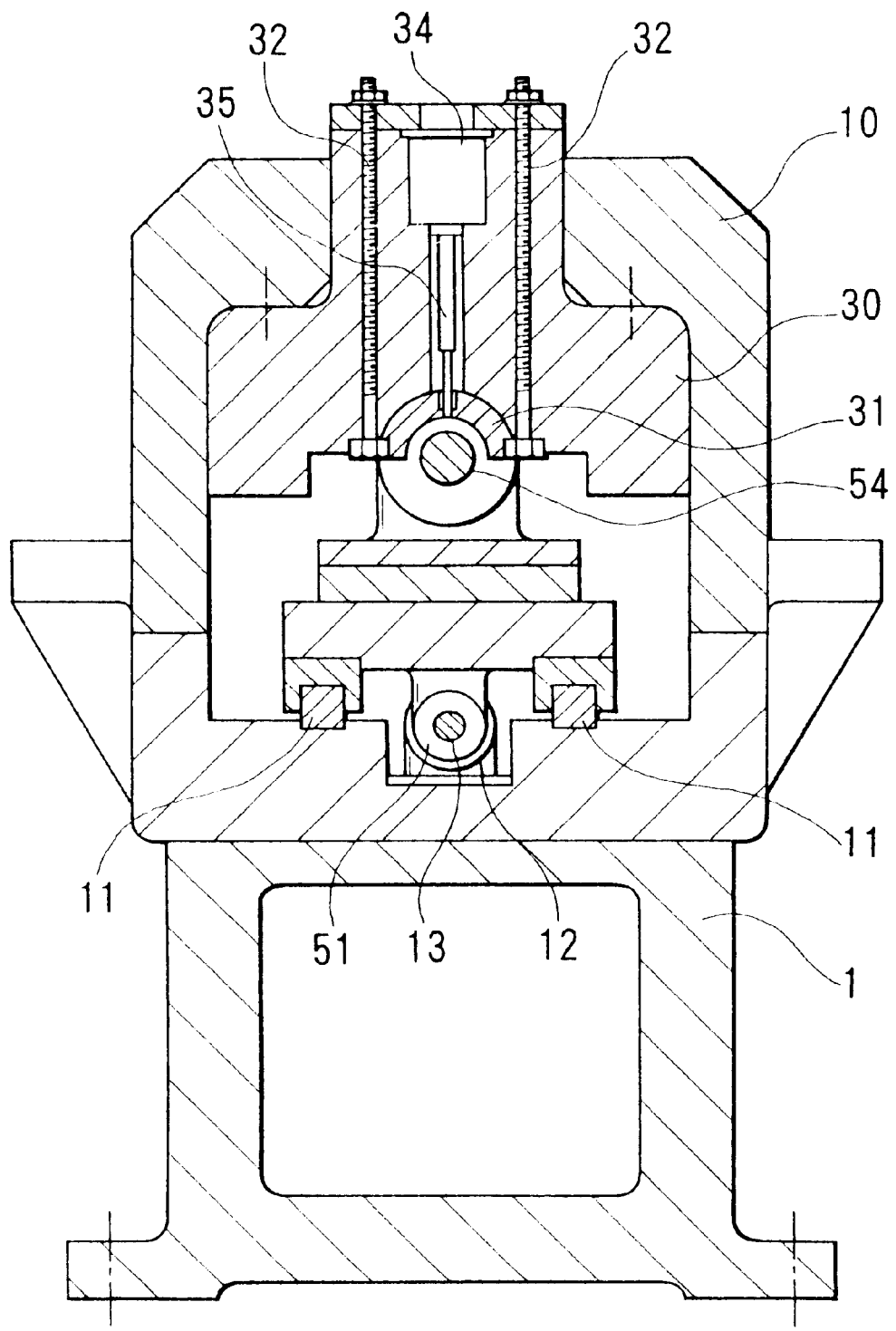
FIG. 2 is a cross-sectional view taken along the line A—A of FIG. 1.
Figure 3:
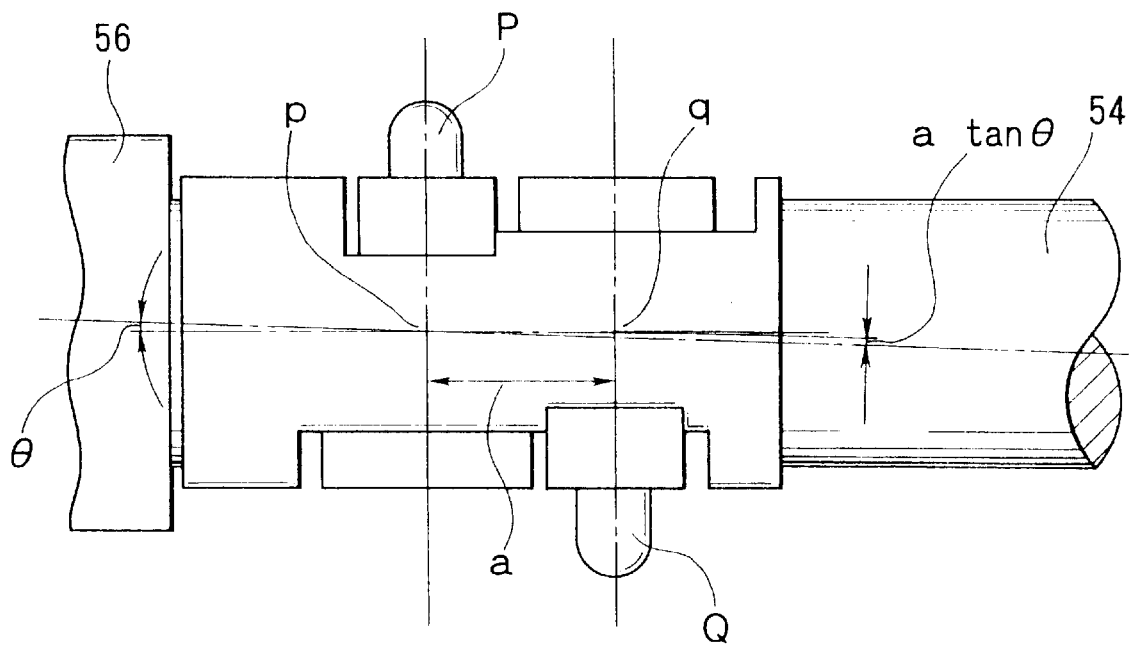
FIG. 3 is a view explaining the condition of mounting of two cutting tools in an exaggerated manner.
Figure 4:
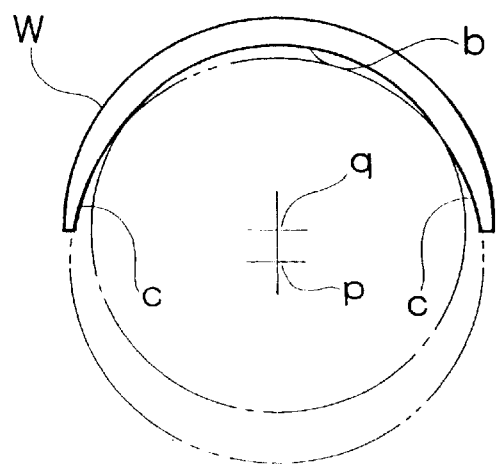
FIG. 4 is a view explaining the processing of a workpiece by the two cutting tools.
Figure 7:
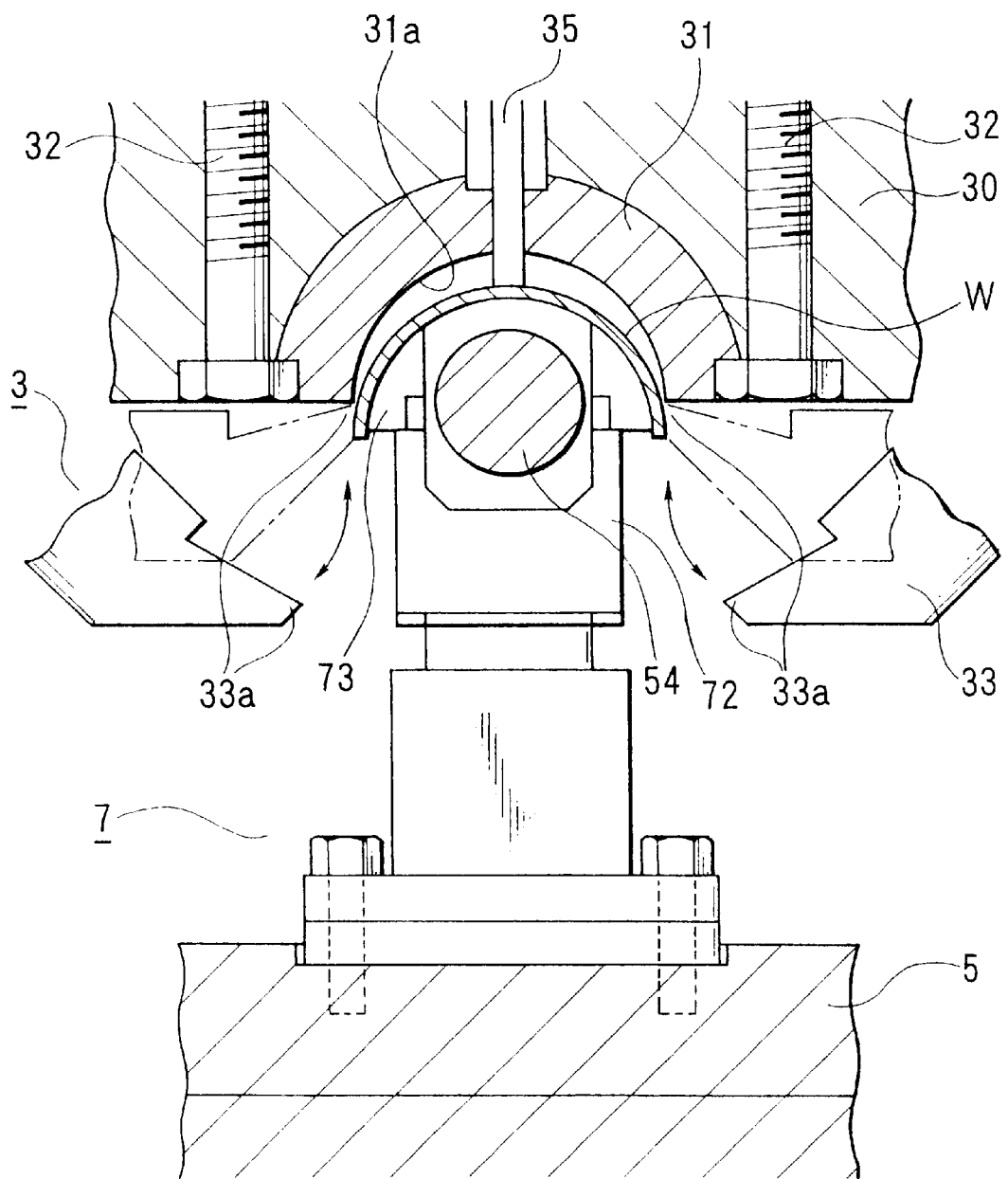
FIG. 7 is a cross-sectional view of workpiece carry-out means located at a workpiece fixing position.

In FIGS. 2 and 7, a cup mounting member 30 is fixedly secured to-the housing 10 by a plurality of bolts, and in a lower surface of the cup mounting member 30 formed is a mounting recess (concave surface) 31a of a semi-cylindrical shape. A semi-cylindrical cup 31 for receiving the workpieces W in intimate contact with the outer surface thereof is fixedly secured to the recessed portion 31a by mounting bolts 32 and 32, the cup 31 having a predetermined wall thickness. With this arrangement, the cup 31 is mounted above the spindle 54 in such a manner that the centerline or longitudinal axis of the cup 31 is coaxial with the axis of the spindle 54 when viewed from the top.

Pivotally-movable fixing arms 33 (whose proximal portions are not shown) are mounted respectively on opposite sides of the lower surface of the cup mounting member 30, and a fixing claw 33a is formed at a distal end of each of the fixing arms 33. The fixing arms 33 are kept in their open positions until the workpieces W are received in the cup 31, and when the workpieces W are received in the cup 31, the fixing arms 33 are pivotally moved toward each other, so that the two fixing claws 33a and 33a firmly hold the opposite side edges of the workpieces W as shown in dots-and-dash lines (FIG. 7), thereby fixing the workpieces W. Thus, the workpiece fixing means 3 is constituted by the cup 31, mounted on the cup mounting member 30, and the two fixing pawls 33a.

A release cylinder 34 is mounted on an upper portion of the cup mounting member 30, and when the release cylinder 34 is driven after the boring processing for the workpieces W is finished, a release pin 35 is ejected from a central portion of the mounting recess 31a.

(Workpiece Carrying-out Means 7)

Figure 8:
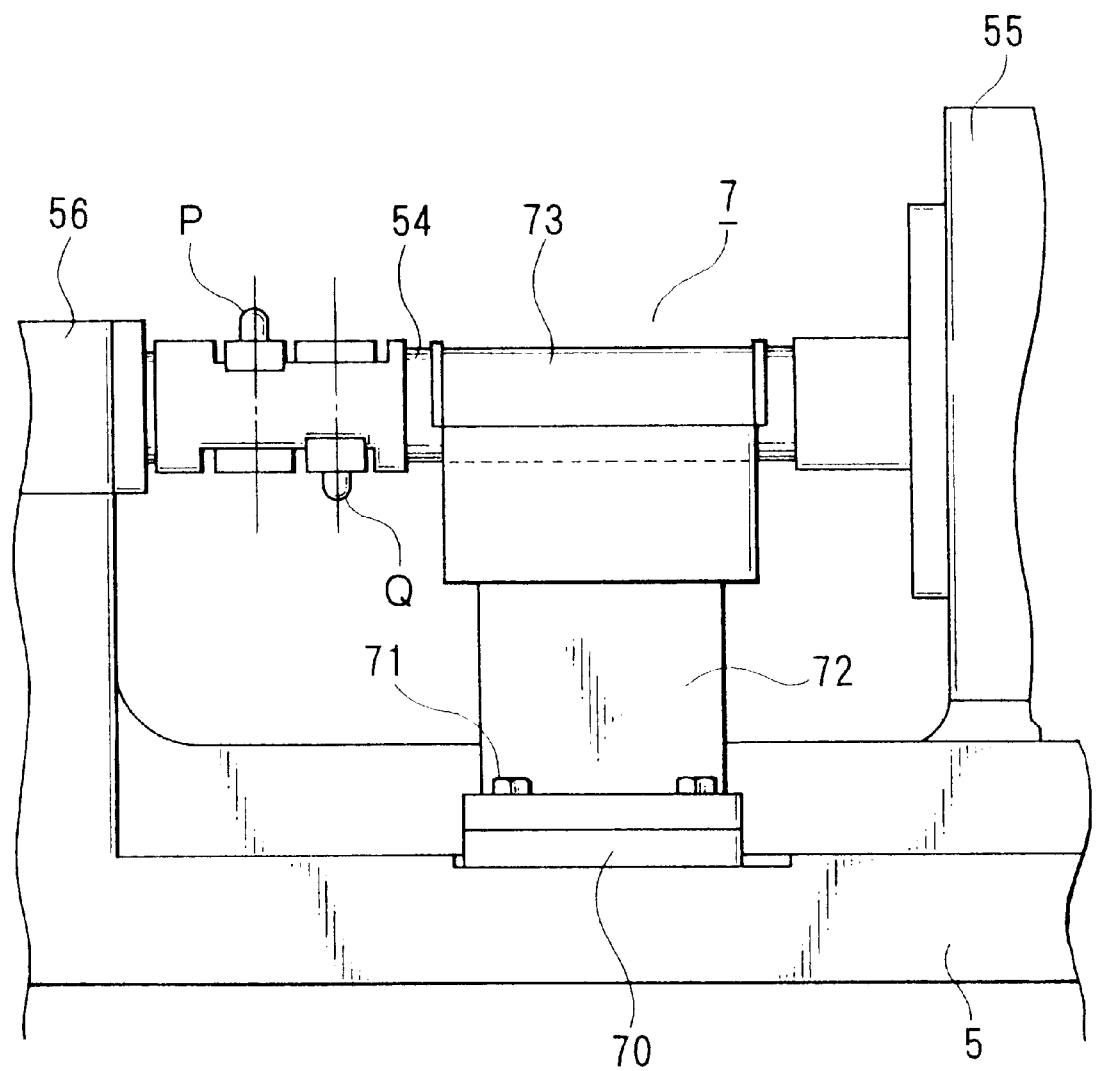
FIG. 8 is a front-elevational view showing the workpiece carry-out means.

As shown in FIG. 1, the workpiece carry-out means 7 for carrying out the workpieces W is fixedly mounted on the table 5 so that this means 7 can be located at the workpiece fixing position Y when the table 5 is moved to the left-side position, and that this means 7 can be located at the workpiece unloading position Z when the table 5 is moved to the right-side position. As shown in FIG. 8, in the workpiece carry-out means 7, a base 70 is fixedly secured to the table 5 by mounting screws 71, and a workpiece carry-out member 72 is mounted on the base 70.

Carry-out members 73 are mounted respectively on opposite sides of an upper portion of the workpiece carry-out member 72. As shown in FIG. 7, an upper surface of each of the carry-out members 73 is formed into a curved surface which is generally equal in curvature to the inner peripheral surface of the workpiece W. When the workpiece carry-out means 7 is located at the workpiece fixing position Y, the release pin 35 is extended to eject the workpieces W received in the cup 31, and the upper surfaces of the carry-out members 73 support the thus ejected workpiece W thereon. Thus, the processed workpieces W are received by the carry-out members 73, and are transferred to the workpiece unloading position Z.

(Workpiece Unloading Means 4)

Figure 9:
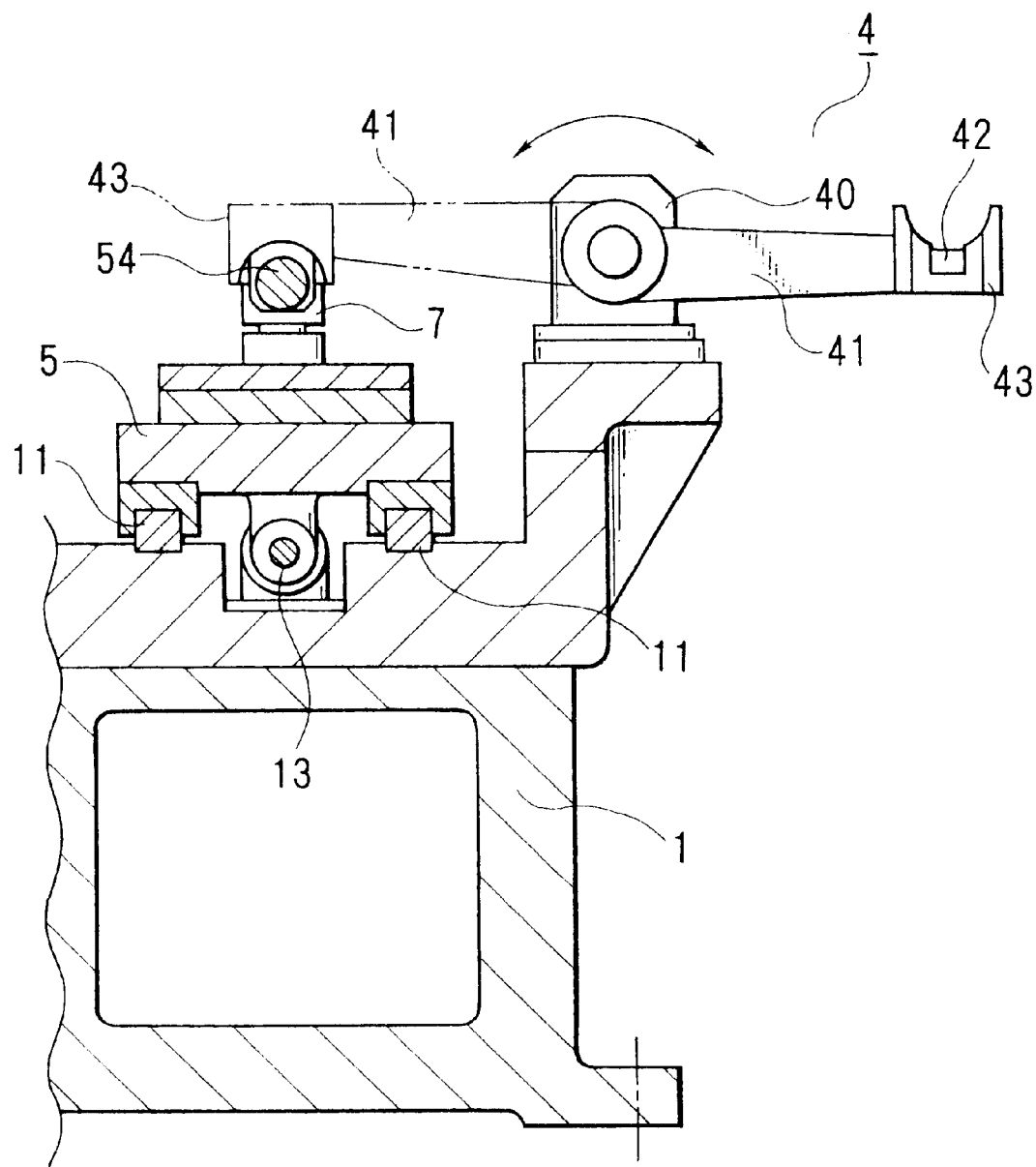
FIG. 9 is a cross-sectional view showing workpiece unloading means located at a workpiece unloading position.

The workpiece unloading means 4 is provided at that portion of the front side of the bed 1 disposed at the workpiece unloading position Z shown in FIG. 1. As shown in FIG. 9, the workpiece unloading means 4 comprises a support post 40 formed upright on a base, and an unloading arm 41 pivotally connected at its proximal end to the support post 40. An unloading cup 43, having an electromagnet 42 fixedly secured thereto, is mounted on a distal end of the unloading arm 41. When the unloading arm 41 is pivotally moved through an angle of 180 degrees to overlie the spindle 54, the unloading cup 43 attracts the workpieces W, placed on the carry-out members 73, through an attractive force of the electromagnet 42. Then, the unloading arm 41 is again pivotally moved to transfer the workpieces W to a position adjacent to the front side of the bed 1.

Next, the operation of the above embodiment will be described.

The servo motor 12 is rotated in its normal direction, so that the table 5 is moved to one side (left-side position) as shown in FIG. 5. The workpiece loading means 6 is located at the workpiece loading position X. At this time, the workpiece carry-in member 64 is disposed adjacent to the distal end of the relay board 24, and the pin head 66a is abutted against the abutment piece 25, mounted on the lower surface of the relay board 24, so that the clamp board 67 is retracted against the bias of the compression spring 68, thereby increasing the distance between the abutment projection 64b and the clamp plate 67. In this condition, the loading pin 22 of the loading cylinder 21 is extended a long stroke to push the two workpieces W simultaneously onto the support surface 64a, so that these workpieces W are placed on the workpiece carry-in member 64.

Then, when the servo motor 12 begins to be rotated in its reverse direction, the table 5 moves toward the other side (right-side position), and the pin head 66a is disengaged from the abutment piece 25, and is moved in a direction of arrow g under the influence of the compression spring 68, so that the two workpieces W are clamped between the abutment projection 64b and the clamp plate 67. The table 5 further moves toward the other side, so that the workpieces W are transferred to the workpiece fixing position Y.

Figure 10:
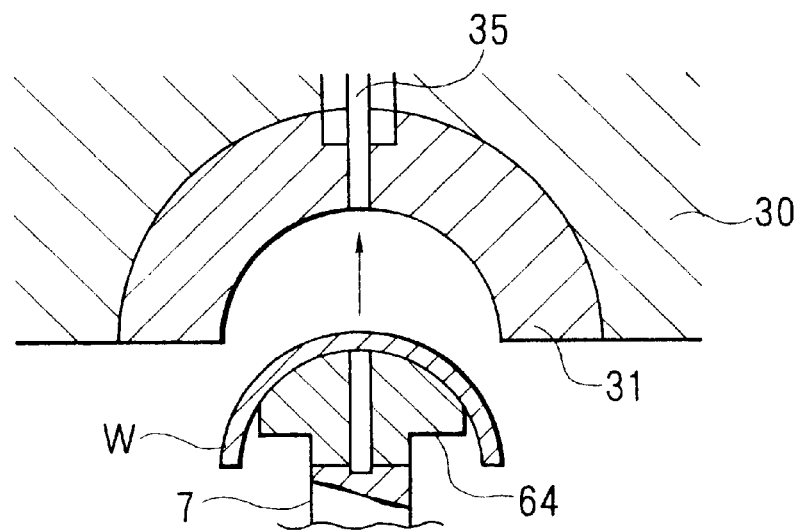
FIG. 10 is a cross-sectional view showing a condition in which the workpiece is transferred to the workpiece fixing position.
Figure 11:
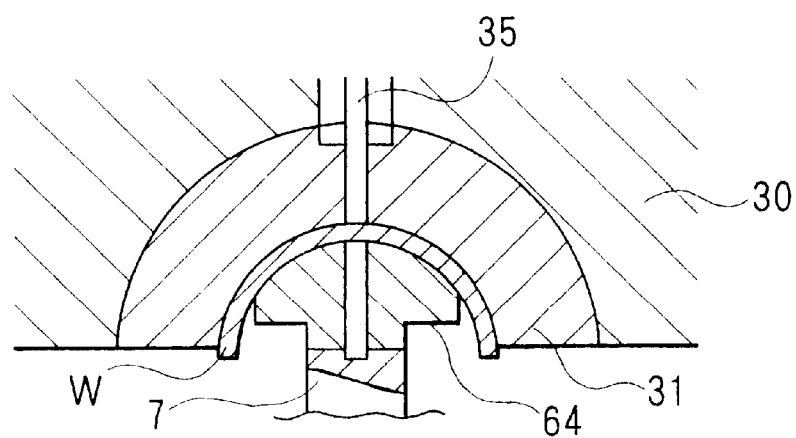
FIG. 11 is a cross-sectional view showing a condition in which the workpiece is fitted into a cup.

The workpieces W, thus transferred to the workpiece fixing position Y, are disposed beneath the cup 31, as shown in FIG. 10. Then, when the lift cylinder 62 (see FIG. 5) of the workpiece carry-in means 6 is driven to extend the plunger 62a, the workpiece carry-in member 64 is moved upward to push the workpieces W into the cup 31, as shown in FIG. 11. Then, the fixing arms 33 are pivotally moved, so that the fixing claws 33a firmly hold the opposite side edges of the workpieces W, as shown in FIG. 7. Then, the plunger 62a is retracted to move the workpiece carry-in member 64 downward. Thus, the workpieces W are supported at their outer surfaces by the cup 31, and the fixing claws 33a firmly hold the opposite sides edges of the workpieces W, and in this condition the workpieces W are ready for the boring processing.

Then, when the servo motor 12 is rotated in its normal direction, the table 5 moves left. During this movement, the inner surface of each workpiece W, fixed to the workpiece fixing means 3, is subjected to the boring processing by the cutting tools P and Q mounted on the spindle 54. Then, the table 5 further moves left, and the workpiece loading means 6 receive unprocessed workpieces W in preparation for the next boring processing.

During the time when the table 5 makes one reciprocal movement (that is, the forward movement and the backward movement), the operation for carrying out the processed workpieces W is effected at the right-side portion of the bed 1.

More specifically, when the table 5 is moved to the left-side position, the workpiece unloading means 7 is located at the workpiece fixing position Y. Then, the fixing arms 33, firmly holding the opposite side edges of the workpieces W, are pivotally moved to their respective open positions (see FIG. 7) at the same timing at which the workpieces W are received by the workpiece loading means 6. At the same time, the release cylinder 34 is driven, and the distal end of the release pin 35 is ejected from the central portion of the cup 31, thereby pushing the processed workpieces W out of the cup 31. The pushed-out workpieces W are received by and placed on the upper surfaces of the carry-out members 73.

When the table 5 is moved to the right-side position, the processed workpieces W are transferred to the workpiece unloading position Z while kept placed on the carry-out members 73 (see FIG. 9).

Then, the unloading arm 41 is pivotally moved, and the unloading cup 43 is fitted over the workpieces W placed on the carry-out members 73, and attracts the workpieces W by the attractive force of the electromagnet 42. Then, the unloading arm 41 is again pivotally moved in the reverse direction, thereby transferring the workpieces W to a position adjacent to the front side of the bed 1. Thereafter, the electromagnet 42 is de-energized, and therefore ceases to produce the attractive force, and then the workpieces W are transferred to a subsequent step.

Thus, in this embodiment, the workpieces W are fixed to the cup 31, accurately positioned relative to the housing 10, with the outer surfaces thereof held in intimate contact therewith, and in this condition the workpieces W are subjected to the boring processing. Thus, the workpieces W are carried in and out by the workpiece carry-in means 6 and the workpiece carry-out means 7 which are provided on the table 5, and the workpiece fixing means 3 is not moved by a moving mechanism as in the conventional machine, and therefore an error due to such a moving mechanism will not develop, so that the precise processing can be effected.

The workpieces W are processed when the table 5 is moved from the other side to the one side, and the carrying-out of the processed workpieces W and the carrying-in of the unprocessed workpieces W are effected simultaneously when the table 5 is moved from the one side to the other side.

Thus, during the time when the table 5 makes one reciprocal movement (that is, the forward movement and the backward movement), the carrying-in of the unprocessed workpieces W and the carrying-out of the processed workpieces W are effected at the same time, and therefore there can be provided the boring machine which can achieve the high operation efficiency. Particularly in this embodiment, two workpieces W are serially arranged, and are subjected to the boring processing at one time, and with this construction the processing can be effected with high efficiency. In the present invention, it is not always necessary to process two workpieces W at one time, but the boring machine may be of such a construction that the workpieces W is fed one by one for processing purposes. If the boring machine may be of such a construction that three or more workpieces are serially arranged, the operation efficiency is further enhanced.

One preferred embodiment of the invention has been described above, but the invention is not limited to this embodiment.

Figure 12:
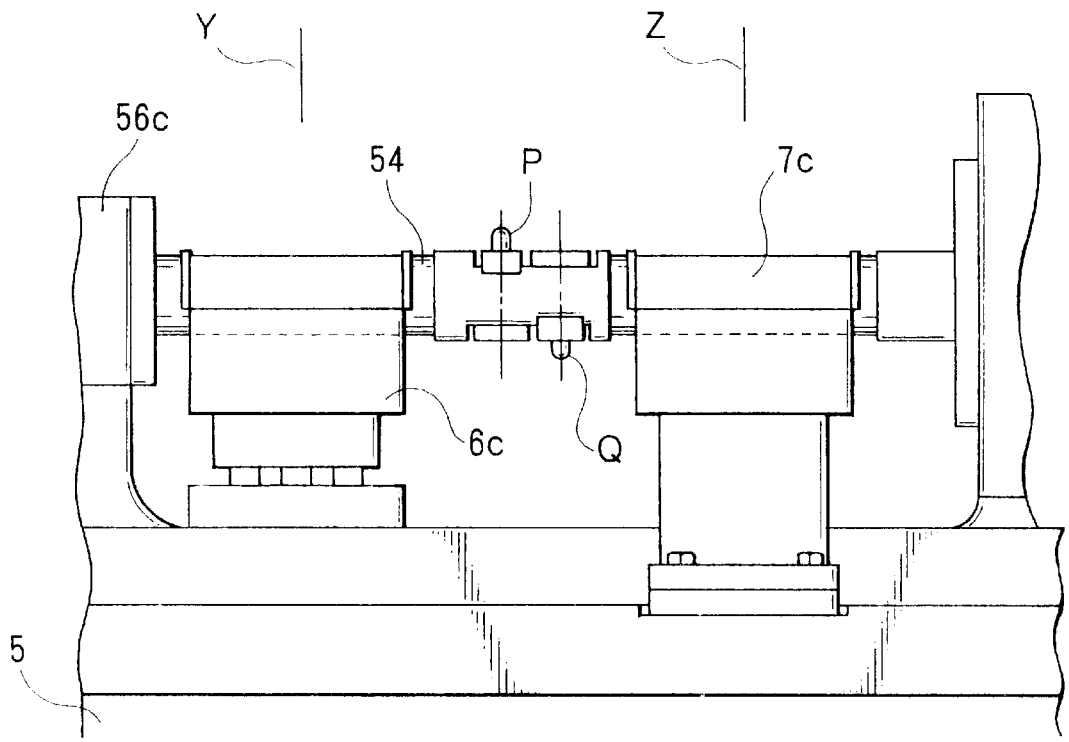
FIG. 12 is a front-elevational view of a portion of another (second) embodiment of the invention.
Figure 13:
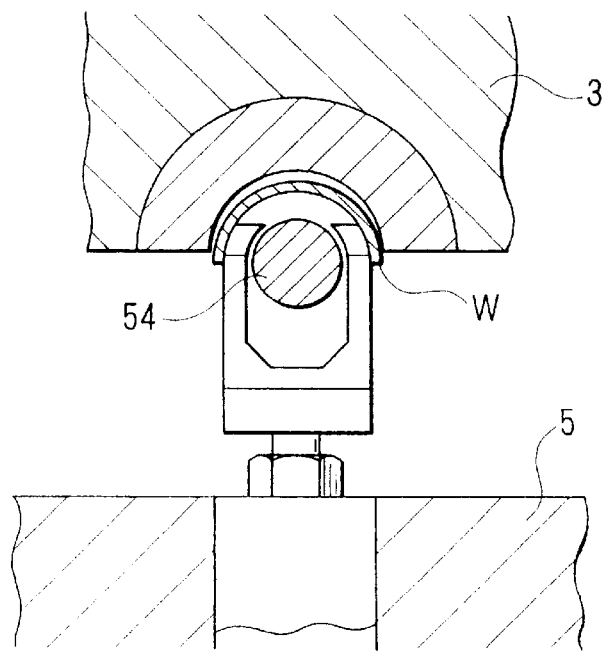
FIG. 13 is a cross-sectional view showing the second embodiment.
Figure 14A:
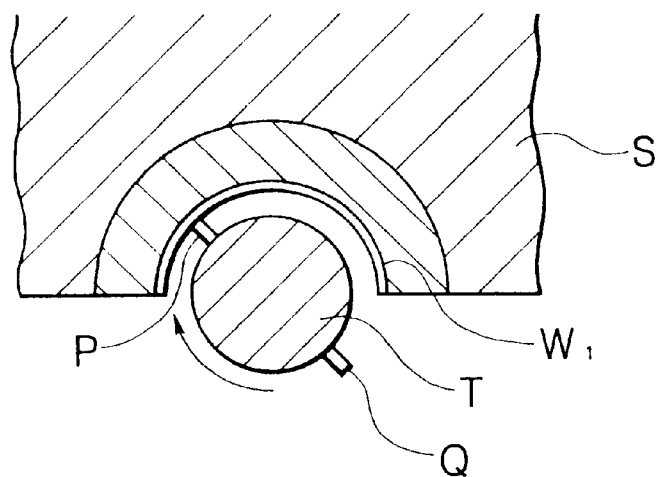
FIGS. 14(A) and 14(B) are views explaining the carrying-in and carrying-out of a workpiece in a conventional technique.
Figure 14B:
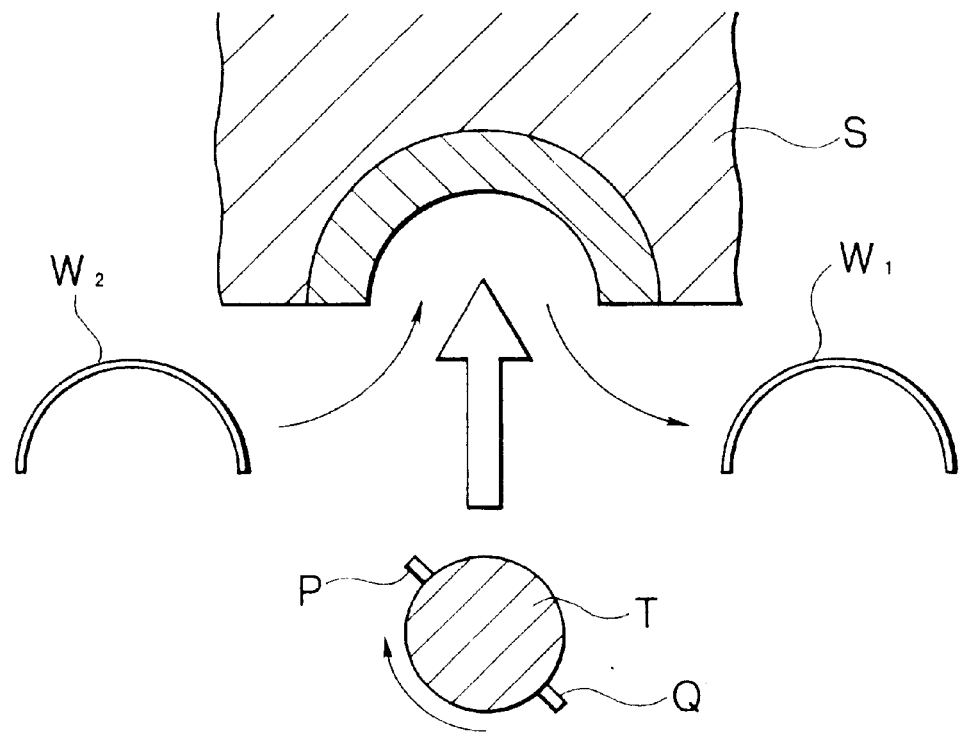

For example, FIGS. 12 and 13 show another (second) embodiment of the invention. In the preceding embodiment, during the reciprocal movement of the table 5, the distal end bearing 56 passes through a narrow space beneath the workpiece fixing means 3. However, the distal end bearing 56 is larger in shape and size than the spindle 54 since this bearing 56 supports the spindle 54. Therefore, it is difficult to apply the invention to a boring machine for processing small-size workpieces W such as half bearings used in an engine of a motorcycle.

This second embodiment is directed particularly to a boring machine for processing small workpieces, and a distal end bearing 56c, which rotatably supports a distal end portion of a spindle 54, is mounted on a table 5. Workpiece carry-in means 6c is provided at that portion of a table 5 disposed between the distal end bearing 56c and cutting tools P and Q. Therefore, in this second embodiment, the distal end bearing 56c does not pass through a narrow space beneath the workpiece fixing means 3, and therefore the distal end bearing 56c positively supports the distal end portion of the spindle 54, and with this construction the invention can be applied to the boring machine for processing small-size workpieces W.

What is claimed is:
1. A boring machine comprising:
means for fixing a workpiece of a semi-cylindrical shape, which is mounted on a central portion of a bed;
a table mounted on said bed for reciprocal movement in right and left directions on said bed;
a spindle mounted on said table, a cutting tool for cutting an inner surface of the workpiece being mounted on said spindle;
means for carrying in said workpiece, which is mounted on said table; and
means for carrying out said workpiece, which is mounted on said table;
wherein said workpiece carry-in means receives the workpiece when said table is moved to one side, and then is moved toward the other side to transfer the workpiece to said workpiece fixing means; and
wherein said workpiece carry-out means receives the workpiece, released from said workpiece fixing means, when said table is moved to said one side, and then is moved toward said other side to transfer the workpiece to a workpiece unloading position;
in which said workpiece carry-in means includes a vertically-movable workpiece carry-in member having an upper surface serving as a support surface for placing the workpiece thereon; and
in which a distal end portion of said spindle is rotatably supported by a distal end bearing mounted on said table, and said workpiece carry-in means is disposed on a same side of said distal end bearing as said one side.

2. A boring machine comprising:
means for fixing a workpiece of a semi-cylindrical shape, which is mounted on a central portion of a bed;
a table mounted on said bed for reciprocal movement in right and left directions on said bed;
a spindle mounted on said table, a cutting tool for cutting an inner surface of the workpiece being mounted on said spindle;
means for carrying in said workpiece, which is mounted on said table; and
means for carrying out said workpiece, which is mounted on said table;
wherein said workpiece carry-in means receives the workpiece when said table is moved to one side, and then is moved toward the other side to transfer the workpiece to said workpiece fixing means; and
wherein said workpiece carry-out means receives the workpiece, released from said workpiece fixing means, when said table is moved to said one side, and then is moved toward said other side to transfer the workpiece to a workpiece unloading position;

in which said workpiece carry-in means includes a vertically-movable workpiece carry-in member having an upper surface serving as a support surface for placing the workpiece thereon; and in which a distal end portion of said spindle is rotatably supported by a distal end bearing mounted on said table, and said workpiece carry-in means is disposed between said distal end bearing and said cutting tool.

3. A boring machine comprising:

means for fixing a workpiece of a semi-cylindrical shape, which is mounted on a central portion of a bed;

a table mounted on said bed for reciprocal movement in right and left directions on said bed;

a spindle mounted on said table, a cutting tool for cutting an inner surface of the workpiece being mounted on said spindle;

means for carrying in said workpiece, which is mounted on said table; and means for carrying out said workpiece, which is mounted on said table;

wherein said workpiece carry-in means receives the workpiece when said table is moved to one side, and then is moved toward the other side to transfer the workpiece to said workpiece fixing means; and wherein said workpiece carry-out means receives the workpiece, released from said workpiece fixing means, when said table is moved to said one side, and then is moved toward said other side to transfer the workpiece to a workpiece unloading position;

in which a distal end portion of said spindle is rotatably supported by a distal end bearing mounted on said table, and said workpiece carry-in means is disposed on a same side of said distal end bearing as said one side.

4. A boring machine comprising means for fixing a workpiece of a semi-cylindrical shape, which is mounted on a central portion of a bed;

a table mounted on said bed for reciprocal movement in right and left directions on said bed;

a spindle mounted on said table, a cutting tool for cutting an inner surface of the workpiece being mounted on said spindle;

means for carrying in said workpiece, which is mounted on said table; and means for carrying out said workpiece, which is mounted on said table;

wherein said workpiece carry-in means receives the workpiece when said table is moved to one side, and then is moved toward the other side to transfer the workpiece to said workpiece fixing means; and wherein said workpiece carry-out means receives the workpiece, released from said workpiece fixing means, when said table is moved to said one side, and then is moved toward said other side to transfer the workpiece to a workpiece unloading position;

in which a distal end portion of said spindle is rotatably supported by a distal end bearing mounted on said table, and said workpiece carry-in means is between said distal end bearing and said cutting tool.

5. A boring machine comprising:

means for fixing a workpiece of a semi-cylindrical shape, which is mounted on a central portion of a bed;

a table mounted on said bed for reciprocal movement in right and left directions on said bed;

a spindle mounted on said table, a cutting tool for cutting an inner surface of the workpiece being mounted on said spindle;

means for carrying in said workpiece, which is mounted on said table; and means for carrying out said workpiece, which is mounted on said table;

wherein said workpiece carry-in means receives the workpiece when said table is moved to one side, and then is moved toward the other side to transfer the workpiece to said workpiece fixing means; and wherein said workpiece carry-out means receives the workpiece, released from said workpiece fixing means, when said table is moved to said one side, and then is moved toward said other side to transfer the workpiece to a workpiece unloading position;

in which said workpiece carry-in means includes a support surface for placing the workpiece thereon, and the workpiece, placed on said support surface, is transferred to said workpiece fixing means while being held in a clamped condition; and in which a distal end portion of said spindle is rotatably supported by a distal end bearing mounted on said table, and said workpiece carry-in means is disposed on a same side of said distal end bearing as said one side.

6. A boring machine comprising:

means for fixing a workpiece of a semi-cylindrical shape, which is mounted on a central portion of a bed;

a table mounted on said bed for reciprocal movement in right and left directions on said bed;

a spindle mounted on said table, a cutting tool for cutting an inner surface of the workpiece being mounted on said spindle;

means for carrying in said workpiece, which is mounted on said table; and means for carrying out said workpiece, which is mounted on said table;

wherein said workpiece carry-in means receives the workpiece when said table is moved to one side, and then is moved toward the other side to transfer the workpiece to said workpiece fixing means; and wherein said workpiece carry-out means receives the workpiece, released from said workpiece fixing means, when said table is moved to said one side, and then is moved toward said other side to transfer the workpiece to a workpiece unloading position;

in which said workpiece carry-in means includes a support surface for placing the workpiece thereon, and the workpiece, placed on said support surface, is transferred to said workpiece fixing means while being held in a clamped condition; and in which a distal end portion of said spindle is rotatably supported by a distal end bearing mounted on said table, and said workpiece carry-in means is disposed between said distal end bearing and said cutting tool.

7. A boring machine, for boring workpieces (W) having a semi-cylindrical shape, the machine comprising:

a bed (1);

a workpiece fixer (3), mounted on a central portion of the bed, having generally the semi-cylindrical shape and including a workpiece clamp (33*a*);

a table (5) slidably mounted on said bed for reciprocal movement, in a single right-left direction, past said workpiece fixer; the bed further comprising:

a spindle (54), rotatably mounted on said table, including a cutting tool for cutting a substantially semi-cylindrical inner surface of the workpiece;

a workpiece carrying-in device (6) mounted on said table on a left side of said cutting tool; and a workpiece carrying-out device (7) mounted on said table on a right side of said cutting tool;

whereby, as the table moves back and forth along the right-left direction, a workpiece placed on the carrying-in device at a left table position is moved rightward to the workpiece fixer, is bored, then is moved by said workpiece carrying-out device to an unloading position at a right table position.

8. The boring machine according to claim 7, wherein the workpiece carrying-in device includes a support surface for placing at least one of the workpieces thereon, to be transferred thereon to said workpiece fixer.

9. The boring machine according to claim 8, wherein said workpiece carrying-in device includes a vertically-movable workpiece carrying-in member, the vertically-movable workpiece carrying-in member includes an upper surface, and the upper surface comprises the support surface for placing at least one of the workpieces thereon.

10. The boring machine according to claim 9, wherein said spindle includes a distal end portion, said distal end portion is rotatably supported by a distal end bearing mounted on said table, and wherein, generally along the right-left direction, the distal end bearing is disposed between the workpiece carrying-in device and the cutting tool.

11. The boring machine according to claim 9, wherein said spindle includes a distal end portion, said distal end portion is rotatably supported by a distal end bearing mounted on said table, and wherein, generally along the right-left direction, the workpiece carrying-in device is disposed between and the cutting tool and the distal end bearing.

12. The boring machine according to claim 7, comprising an unprocessed workpiece loader at the left side of said bed.

13. The boring machine according to claim 7, comprising a processed workpiece unloader at the right side of said bed.

14. The boring machine according to claim 7, wherein the fixer accommodate more than one of the workpieces serially arranged, whereby a plurality of the workpieces is simultaneously bored.

* * * * *